United States Patent [19]
Penger

[11] Patent Number: 5,660,361
[45] Date of Patent: Aug. 26, 1997

[54] ROTARY DEVICE FOR SUPPORTING RECEPTACLES

[75] Inventor: Georg Penger, Oberappersdorf, Germany

[73] Assignee: Anton Steinecker Entwicklungs GmbH & Co., Germany

[21] Appl. No.: 390,925

[22] Filed: Feb. 16, 1995

[30] Foreign Application Priority Data

Feb. 16, 1994 [DE] Germany .................. 44 04 916.1

[51] Int. Cl.⁶ .................................................. A47F 5/02
[52] U.S. Cl. ............................ 248/131; 248/346.06
[58] Field of Search ........................... 248/131, 128, 248/186.2, 311.2, 346.06, 349.1, 346.07, 346.5; 211/78, 163; 52/118, 111

[56] References Cited

U.S. PATENT DOCUMENTS

| | | | |
|---|---|---|---|
| 1,463,706 | 7/1923 | Ketchum | 248/349.1 |
| 1,684,925 | 9/1928 | Perlmutter | 248/346.07 |
| 2,225,273 | 12/1940 | Jacobs | 29/89 |
| 2,738,245 | 3/1956 | Campbell | 248/186.2 |
| 2,807,370 | 9/1957 | Kellerman | 211/78 |
| 2,830,170 | 4/1958 | Sillifant et al. | 219/159 |
| 3,881,715 | 5/1975 | Creek | 269/45 |
| 4,688,612 | 8/1987 | Kessel et al. | 144/3 R |
| 4,770,400 | 9/1988 | Questel | 269/104 |
| 5,181,686 | 1/1993 | Barthel | 248/346.07 |
| 5,267,824 | 12/1993 | Kishi | 52/118 |

FOREIGN PATENT DOCUMENTS

| | | |
|---|---|---|
| 2377868 | 8/1978 | France. |
| 160045 | 5/1904 | Germany. |
| 28 35 695 | 3/1979 | Germany. |
| 90 15 425.8 | 3/1991 | Germany. |
| 1048935 | 11/1966 | United Kingdom. |

OTHER PUBLICATIONS

Thieler –Schweissvorrichtungen, Kuka product brochure, undated.
Sonder–Schweissvorrichtungen, Tehag product brochure, undated.

Primary Examiner—Leslie A. Braun
Assistant Examiner—Willie Berry, Jr.
Attorney, Agent, or Firm—Seed and Berry LLP

[57] ABSTRACT

In a rotary device for supporting a receptacle having at least three support arms connected in a star-shaped configuration, the support arms are extensible to permit an easy adaptation to different diameters of the receptacle. A fixing device is attached to each support arm to secure the support arm in a selected extended position. Centering brackets are attached to the support arms for centering the receptacle on the rotary device.

11 Claims, 1 Drawing Sheet

Rotary Device For Supporting Receptacles

TECHNICAL FIELD

The present invention relates to a rotary device for supporting receptacles with at least three support arms that are connected in a star-shaped configuration.

BACKGROUND OF THE INVENTION

Such a known rotary device is used for supporting receptacles, in particular, round receptacles, such as brewing kettles or the like, during manufacture thereof, for instance during welding or polishing. Whenever receptacles with a large diameter are to be supported by the known rotary device, extensions have to be screwed onto the support arms. This means that an adaptation to different diameters of the receptacles to be treated is not easily possible with the known rotary device, which is disadvantageous.

SUMMARY OF THE INVENTION

It is therefore the object of the present invention to develop a rotary device of the above mentioned type in such a manner that an adaptation to different diameters of the receptacles, in particular large diameters, is easily possible.

To achieve said object the invention suggests that the support arms should be extensible in a rotary device of the above mentioned type. This makes the length of the support arms adjustable, so that these can easily be adapted to receptacles of different diameters by being extended. The former troublesome screwing of extensions is not necessary.

To make the support arms extensible in a user-friendly manner, an especially preferred embodiment of the invention suggests that each support arm should consist of a basic support and an additional support which is supported on the basic support in a displaceable and fixable manner. This has the additional advantage that the additional support cannot be displaced, as it is always disposed on the basic support.

In accordance with another development of the invention each additional support arm is supported on a lower roller bearing and an upper roller bearing, with the lower roller bearing being arranged on the basic support and the upper roller bearing on the additional support. The two roller bearings prevent the additional support from tilting or getting jammed, thereby permitting a uniform extension of the additional support by the application of a small force.

To extend the support arms at a specific predetermined diameter of the receptacle to the right length, a development of the invention provides for the provision of each support arm with marks for setting a specific length. The marks are provided on both the basic support and the additional support.

When the receptacle is, for instance, placed on the rotary device by means of a crane, it must be positioned in a centered manner so that, when the receptacle is subsequently rotated, the tools acting on the receptacle, for instance welding or polishing apparatus, always have the same distance from the receptacle. That is why another development of the invention provides for at least one centering bracket for the receptacle on each support arm. A centering bracket is here advantageously arranged on an outer end of each additional support. In case a receptacle having a large diameter exceeding the diameter of the basic support is to be placed on the rotary device, each of the additional supports will be extended to such an extent that the centering brackets mounted on the outer ends of each additional support center the receptacle towards the center of the rotary device. In case a receptacle having a diameter smaller than the diameter of the basic support is to be placed on the rotary device, additional centering brackets will expediently be attached onto the basic support at the corresponding positions. The receptacle will then be centered towards the center of the rotary device by means of the attached centering brackets. The centering brackets may be attached to the basic supports at those positions at which the marks are located, the spacing of the possible positions corresponding to the spacing of the marks.

Each of the centering brackets advantageously includes a support surface for the receptacle to be treated, with a lower edge of the receptacle being placed on said support surface when the receptacle is being placed on the rotary device. The support surfaces are downwardly inclined towards the center of the rotary device so that upon a farther lowering of the receptacle the latter can be moved towards the center of the rotary device in accordance with the inclination of the support surface and can thereby be centered in a simple manner.

When electric welding work is performed on the receptacle, it is necessary that the receptacle be grounded. That is why in accordance with another embodiment of the invention grounding lines are arranged on each basic support and additional support for grounding the container. An especially simple construction for the grounding line will be obtained when the grounding lines are formed as rails on which the receptacle rests. Since the grounding lines may be worn by the receptacles resting thereon, the lines are expediently replaceable. To dispense with separate grounding connections for each support arm, the grounding lines are advantageously equipped with a common grounding connection.

BRIEF DESCRIPTION OF THE INVENTION

The invention shall now be explained in more detail with reference to the drawing. The drawing illustrates an embodiment of the invention wherein.

DETAILED DESCRIPTION OF THE INVENTION

Figure 1:
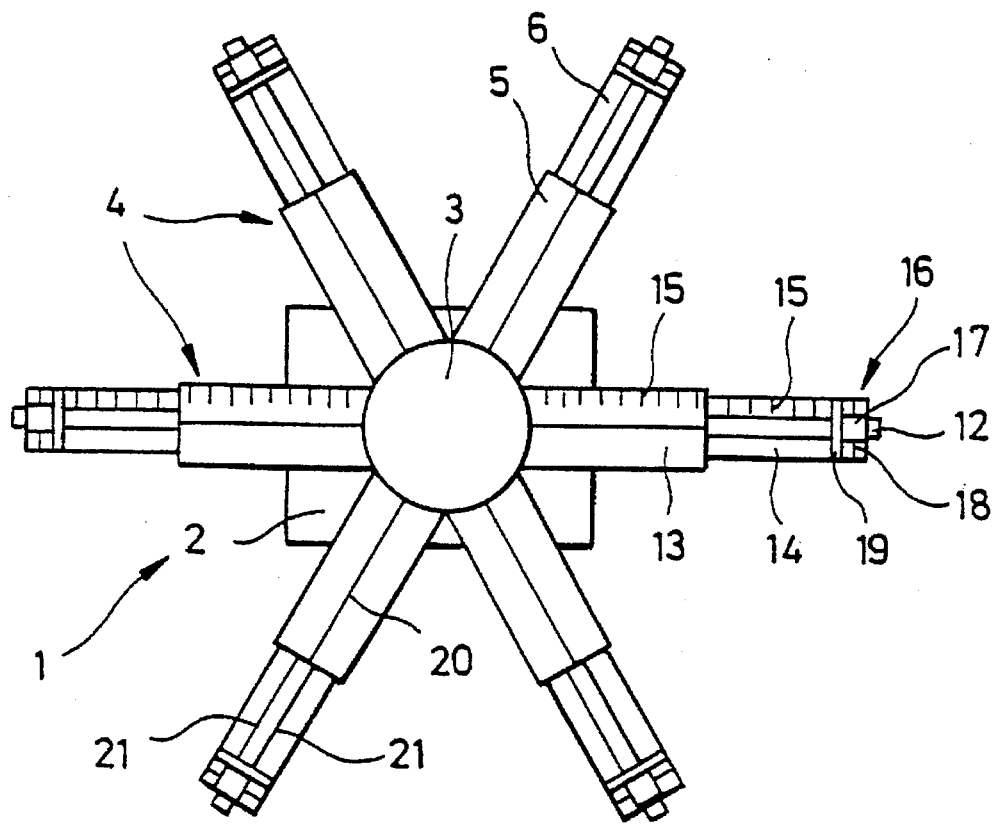
FIG. 1 is a top view on the rotary device.
Figure 2:
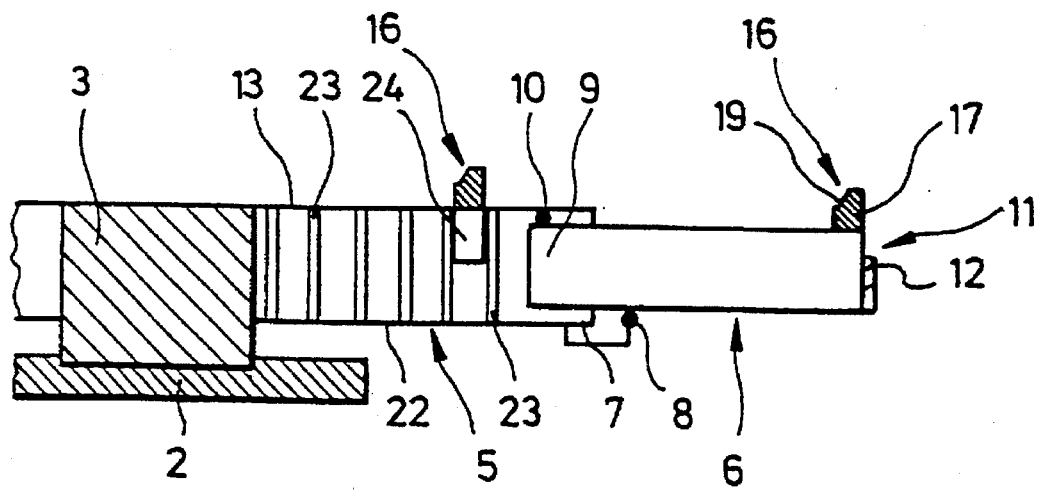
FIG. 2 is a cross section through the rotary device according to FIG. 1, partly broken away.

The rotary device 1 consists of a mounting 2, a rotary axis 3 rotatably supported therein and of six support arms that are arranged in a star-shaped configuration on the support axis 3. Each support arm 4 consists of a basic support 5 and an additional support 6 which can be displaced in telescopic fashion inside the basic support 5. A lower roller bearing 8 is provided approximately at the front end 7 of each basic support 5 and an upper roller bearing 10 is arranged at the rear end 9 of each additional support 6. The additional support 6 is supported via the two roller bearings 8 and 10 and can thus be withdrawn from or slid into the basic support 5 in a simple manner. A fixing device 12 for fixing the additional support 6 in its position is disposed on the outer end 11 of the additional support 6. The fixing device 12, such as a clamping mechanism or the like, is coupled to the basic support 5 in a conventional manner such that when the fixing device is in an engaged position, the fixing device prevents movement of the additional support 6 relative to the basic support. When the fixing device 12 is in a released position, the additional support 6 is telescopically movable relative to the basic support 5.

The basic support 5 and the additional support 6 are provided on their upper sides 13 and 14, respectively, with marks for setting a specific length of the whole support arm 4. Moreover, a centering bracket 16 which serves to center the receptacle on the rotary device is mounted on the upper side 14 of each additional support 6 near the outer end 11 thereof. The centering bracket 16 consists of a basic body 17 with grips 18 and a support surface 19 provided on the basic body 17, which extends obliquely downwards and towards the rotational axis 3. In its lower portion the support surface 19 extends in parallel with the rotary axis 3, so that the receptacle is positioned on the rotary device 1 by means of said support surface 19 in such a centered manner that the axis of the receptacle corresponds to the rotational axis 3. Since the receptacle must be grounded during electric welding, a grounding line 20 is provided on the upper side 13 of each basic support 5 and two grounding lines 21, on which the receptacle can be supported, are disposed on the upper side 14 of each additional support 6. The grounding lines 21 are connected to the grounding line 20 in an electrically conductive manner. Furthermore, all grounding lines 20 of the individual basic supports 5 are connected to the rotational axis 3 via a common grounding connection (not shown in more detail). Since the grounding lines 20 and 21 are subject to wear, they are replaceably mounted on the upper sides 13 and 14.

In their initial position the additional supports 6 are slid into the basic support 5 of the rotary device 1. In case a small receptacle having a specific diameter smaller than the diameter of the basic support 5 is to be placed on the rotary device, a centering bracket 16 will be attached to each basic support 5 at marks 15. The receptacle will then be lowered onto the rotary device and placed in centered fashion on the rotary device 1 by means of the centering bracket 16.

In case a large receptacle is to be mounted whose diameter exceeds the diameter of the basic support 5, the fixing device 12 will be released on each additional support 6 and each additional support will be extended from its corresponding basic support 5 to the corresponding length following from the marks 15 on the additional support 6. The additional support 6 will then be fixed by means of the fixing device 12. As described above, it is now possible to mount the receptacle; the centering brackets 16 fixedly provided on the additional supports 6 center the receptacle again by means of the support surfaces 19. The rotary device is subsequently rotated to perform corresponding work, such as welding or polishing, on the receptacle. After such work has been completed, the receptacle is again removed from the rotary device, the fixing device 12 is released, and each of the support arms 6 is again retracted into the basic support 5 and again fixed via the fixing device 12. An adaptation to different receptacle diameters is thus possible in a simple manner and within a short period of time. Since the additional supports 6 are retracted into the basic support 5 in their initial position, additional storing space is not needed for the additional supports 6.

The upper side 13 and a bottom side 22 of the basic support 5 are connected to side struts 23 which have a spacing in accordance with the pattern of marks 15. The basic body 17 of the centering bracket 16 has a U-shaped profile, with side flanks 24 of the basic body 17 engaging between side struts 23 when the centering bracket 16 is attached onto the basic support 5, and being retained by said struts. This prevents the centering brackets 16 from tilting outwards when the receptacle is being centered, since a possible tilting moment caused by the impact of the receptacle on the support surface 19 is intercepted by the side struts 23 via the side flanks 24.

Numerous modifications and variations of the rotary device for supporting receptacles disclosed herein will occur to those skilled in the art in view of this disclosure. Such modifications and variations may be practiced while remaining within the spirit and scope of the invention as defined in the following claims.

What is claimed is:

1. A rotary device for supporting a receptacle, in particular a round receptacle, comprising a mounting, a rotary axis rotatably connected to the mounting, and at least three support arms extending radially outward from the rotary axis, said support arms being rotatable with the rotary axis relative to the mounting and being extensible, each of said support arms comprises a basic support and an additional support which is displaceably and fixably supported in said basic support, and each of said additional supports is supported on a lower roller bearing and an upper roller bearing, said lower roller bearing being arranged on said basic support and said upper roller bearing on said additional support.

2. The rotary device according to claim 1 wherein each of said support arms is provided with marks for setting a specific length of said support arms.

3. The rotary device according to claim 1 wherein at least one centering bracket is provided on each support arm for centering the receptacle.

4. The rotary device according to claim 3 wherein a centering bracket is arranged on an outer end of each additional support.

5. The rotary device according to claim 3, further comprising additional centering brackets that are adapted to be attached onto said basic support.

6. The rotary device according to claim 5 wherein said additional centering brackets are adapted to be attached at a spacing corresponding to the spacing of said marks.

7. The rotary device according to claim 3 wherein each of said centering brackets comprises a support surface for said receptacle.

8. A rotary device for supporting a receptacle, in particular a round receptacle, comprising a mounting, a rotary axis rotatably connected to the mounting, at least three support arms extending radially outward from the rotary axis, and grounding lines attached to said support arms for grounding said receptacle, said support arms being rotatable with the rotary axis relative to the mounting and being extensible, each of said support arms comprises a basic support and an additional support which is displaceably and fixably supported in said basic support, and said grounding lines are arranged on each basic support and on each additional support for grounding said receptacle.

9. The rotary device according to claim 8 wherein said grounding lines are formed as rails on which said receptacle rests.

10. The rotary device according to claim 8 wherein said grounding lines are replaceable.

11. The rotary device according to claim 8 wherein said grounding lines have a common grounding connection.

* * * * *